United States Patent Office 2,972,783
Patented Feb. 28, 1961

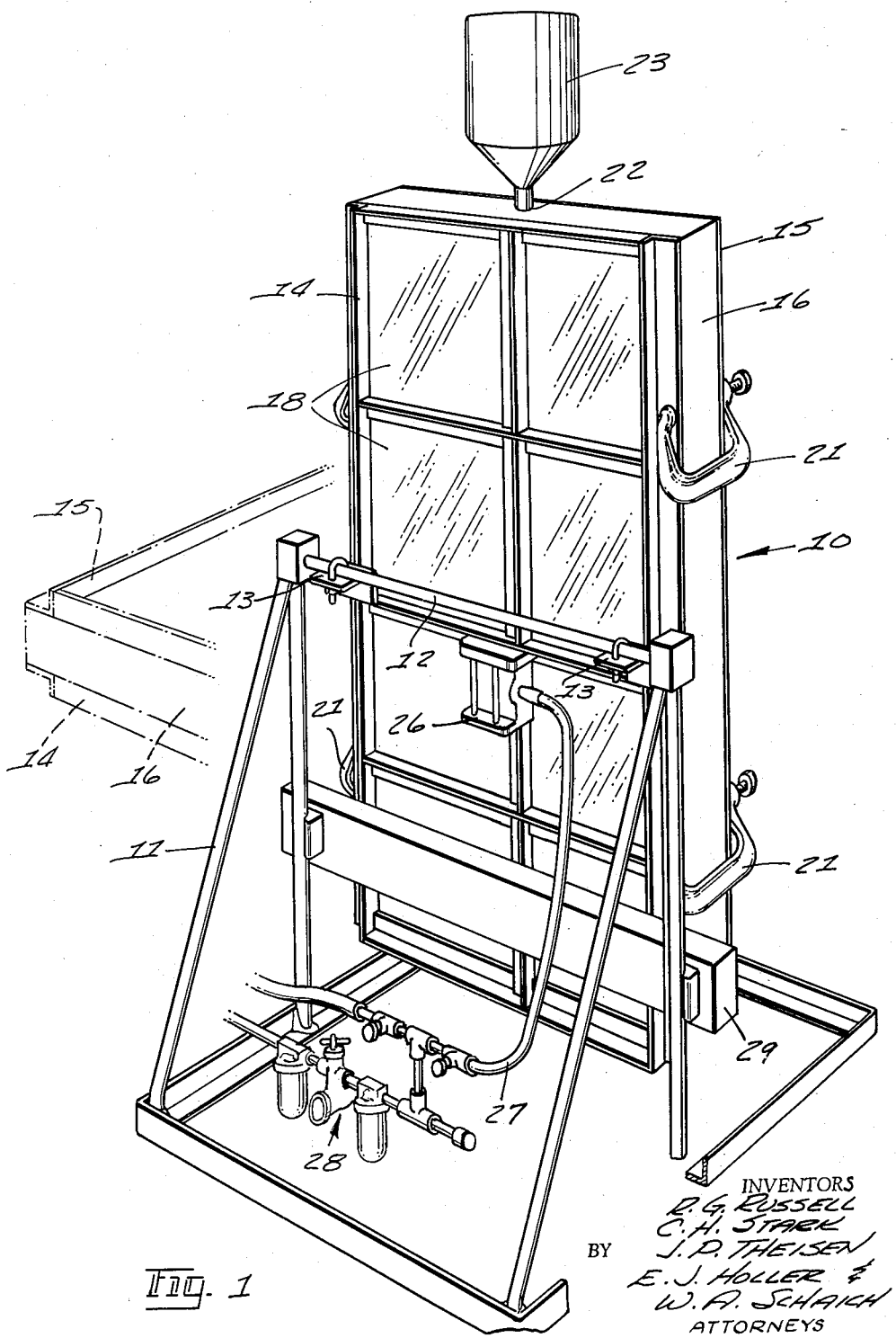

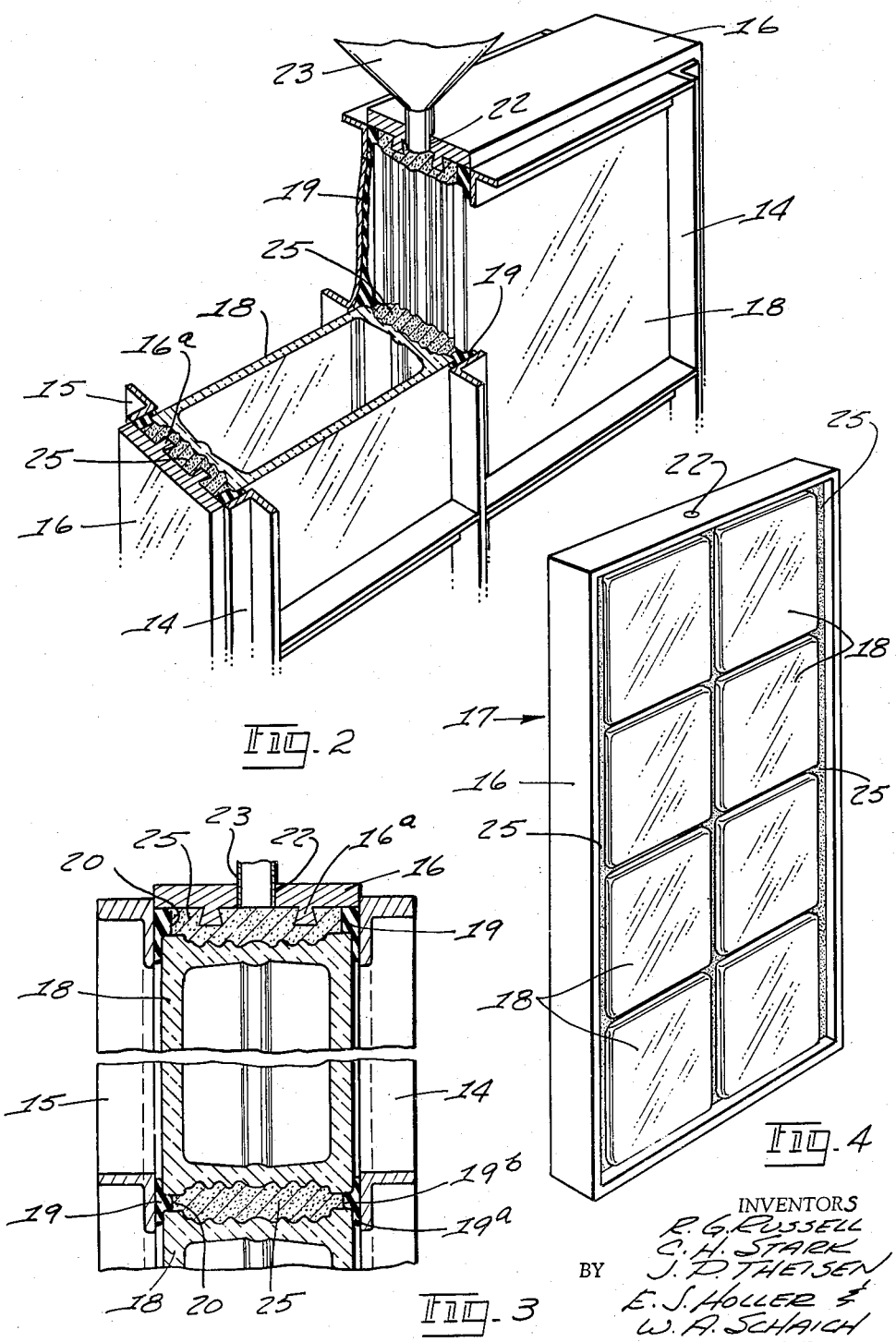

2,972,783

METHOD FOR FABRICATING GLASS BLOCK PANELS

Richard G. Russell and Jean P. Theisen, Sylvania, and Charles H. Stark, Waterville, Ohio, assignors to Kimble Glass Company, a corporation of Ohio Filed Dec. 2, 1957, Ser. No. 700,205

1 Claim. (Cl. 18—59)

The present invention relates to light-transmitting panels and has for its general object providing an improved method for fabricating a unitary glass block panel.

The resultant panel structure which is capable of simple fabrication according to the present invention is more readily formed than those heretofore proposed. The subject panel structures which are termed glass block wall panels for purposes of describing this invention may be equally referred to as skylighting or rooflighting panels.

Previously, grid structures for rooflights have been comprised of structural members consisting of extruded rigid metallic strips or elements arranged in intersecting or interlocking relationship with each other to conjunctively form a grid and frame containing a plurality of hollow individual cells. Into each cell has been fitted a light-transmitting element preferably of glass or equivalent transparent and/or translucent material, each individual block element being retained in a cell by localized cement or mortar.

These structures which have been primarily designated for application to roof or wall openings of simple construction have involved the utilization of a considerable number of grid parts and complicated framing. The light-transmitting glass units or block are supported by rather wide interlocking flange members retaining the lower corners or edges of each block, their sides being retained by the cementitious material. The amount of available light-transmitting area per unit of rooflighting or skylight has been considerably reduced by the various forms of metal strut and cement grid work between the glass block units. In addition, panels of this nature have been extremely costly to manufacture.

Accordingly, it is an object of the present invention to provide a novel method of prefabricating a light-transmitting wall or roof panel characterized by simplified assembly and molding steps.

Another object of this invention is to produce a unitary panelized structure containing a series of glass blocks in permanently and durably retained condition, the panel possessing superior light-transmitting properties with its grid work constituting minimized exposed areas of essentially moldable material.

Another object of this invention is to provide a method of assembling a plurality of glass block units into a durable panel with the glass block units uniformly spaced within a cast or molded frame work of cementitious material, the panel having an integrally-united surrounding mounting frame.

A further object of this invention is to provide a unique and expeditious method of molding a glass block panel having a plurality of glass block cells permanently secured in uniformly-spaced, weather-tight arrangement within a fully tuck-pointed, cementitious grid surrounded by metallic framing.

The specific nature of this invention, as well as other objects and advantages thereof, will become apparent to those skilled in the art from the following detailed description, taken in conjunction with the annexed sheets of drawings on which, by way of preferred example only, are illustrated the preferred embodiments of this invention.

Referring to the accompanying drawing, forming a part of this specification and in which like numerals designate like parts in all the views:

Fig. 1 is a perspective view of one embodiment of fabricating apparatus for forming the subject panel, an alternate position thereof being shown partially in broken lines.

Fig. 2 is a perspective view partially in section of a portion of a jig assembly in which a panel is being fabricated in accordance with this invention.

Fig. 3 is a fragmentary vertical sectional view of the apparatus of Fig. 2.

Fig. 4 is a perspective view of a completed panel.

The present invention primarily relates to a wall panel formed by the method hereinafter described. The preferred method utilizes square or rectangular hollow glass blocks, cells, or units having twin light-gathering and/or directing face panels which are essentially planar on their exterior surfaces, the blocks having an approximately equal overall thickness of about 2 inches, for example. The interior surfaces of the block faces may be provided with light-controlling prismatic surfaces such as known in the art, if desired. Additionally, the glass blocks may be formed in any desired pattern, shape, or configuration for employment in this invention and also may have colored and/or light-diffusing faces.

A preferred form of the subject glass block wall panel consists of the blocks being arranged in aligned regular relationship with minimized spacing between the extremities of contiguous blocks. Although the present invention is described herein as pertaining to a wall panel, it is fully contemplated that the panelized structure may be equally applicable to a suitable roof opening to furnish a skylight or rooflight.

Before the cellular glazing units such as glass blocks are taken for assembly into panelized form, each of the blocks 18 is preferably sprayed over its side surfaces with a layer (not shown) of bonding agent to provide adhesion-promoting surfaces for joining the blocks to a cementitious bonding agent. The adhesion-promoting material which is placed over the side surfaces of the blocks 18 as a coating may consist of a latex-containing material such as "Cretite," distributed by United Laboratories Incorporated, Cleveland, Ohio. "Cretite" consists of an aqueous latex solution carrying a concentrated suspension of fine particles of flint to furnish proper adherence of cement or mortar to the glass surfaces. It is preferred that only the sides of the blocks be coated with a thin layer of adhesion-promoting material.

Similarly, it is contemplated that the coating may be comprised of tetrabutyl titanate which is deposited on the block side surfaces from an organic or aqueous solution. If necessary, the coating may be thermally cured on the glass surfaces although no such curing is necessary in the application of "Cretite," However, in the case of the tetrabutyl titanate, curing by heating the blocks to about 250° F. for one hour is desirable.

Referring to the drawings and particularly to Fig. 1, the present method employs a molding jig asesmbly 10 mounted on an upright triangular supporting base 11. A horizontal cylindrical bar 12 is mounted at the top of support base 11 for retaining the working components of jig assembly 10 in pivotal relationship.

Jig assembly 10 is formed of upper and lower glass block retention plates 14 and 15 respectively. Lower plate 14 is centrally attached on its underside to the horizontal bar 12 of the base 11 by several brackets and U-shaped bolts designated by the numeral 13. The jig assembly 10 is illustrated in Fig. 1 in an upright position with its shorter sides in upepromost and lowermost nearly vertical arrangement for the molding operation.

Also as shown pictorially in Fig. 1 in broken lines, the bottom plate 14 is initially disposed in a horizontal plane and a series of similar glass blocks 18 are arranged thereon in adjacent spaced-apart alignment. A surrounding and enclosing mold frame 16 and upper plate 15 are brought into contacting aligned relationship with lower plate 14 to completely enclose and surround the blocks 18. Frame 16 has a similar coating of "Cretite" or other material over its interior surfaces to assist bonding a cementitious material thereto. Frame 16 also has several longitudinal dovetails 16a extending along the full length of its inner surfaces. Frame 16 is essentially of the same thickness as the blocks 18 and may be fabricated of aluminum metal or aluminum alloy, for example.

The frame or perimeter 16 is clamped between the two jigs or face plates 14 and 15 after the glass blocks 18 have been arranged in place. Arranging of the blocks 18 is performed while the lower jig 14 rests in a horizontal position with the frame 16 supported thereon as illustrated in Fig. 1. The other or upper face plate 15 is then placed in sealing relationship over the frame 16.

Each of the face plates 14 and 15 has a gridwork disposed over their opposing surfaces directed toward the spaces between the blocks. The grid members 19 are comprised of soft rubber or equivalent resilient material and each includes a horizontal flange portion 19a for adhesive attachment to the inner surfaces of the corresponding frame member 14 or 15. Also, each of the grid members 19 has a beaded portion 19b which enters the outer extremity of the space between either the blocks, or block and frame as the case may be, to function as a positioning pilot or aligning means. All of the strips 19 are previously coated with a mold release agent such as a mixture of a polyethylene dispersed within a liquid petroleum oil. Both the flange portions 19a and beads 19b reside in common planes respectively.

The edges of the outer faces of the glass blocks 18 rest upon the resilient flanges 19a so as to form a seal between each of the blocks and the grid structure. The beads or risers 19b may have a thickness and contour so as to be slightly compressed by the adjacent opposing edges of the blocks to also serve in a mold sealing capacity. The extremities of the beads 19b are rounded so as to mold the edges of the motor strips with a desirable tuck-pointed finish 20 after molding.

The two face plates 14 and 15 are clamped together around both the framing perimeter 16 and plurality of blocks 18 by any suitable clamp means such as by a spaced series of C-clamps 21. The entire assembly is rotated through either a right angle or an acute angle of about 45° to be stood on its side projecting upwardly as shown in Fig. 1. The lower plate 14 contacts a stop member 29 affixed to base 11 to position the assembly in the desired upright arrangement. The face plates 14 and 15 and frame 16 thus cooperate to form a mold within which the panel may be cast.

The panel frame 16 is provided with at least one opening 22 in an upper side arranged to register with a lineal series of interblock spaces. A funnel 23 is placed in the side opening 22 for the introduction of bonding material into the open spaces between the blocks.

A fairly fluid mixture of mortar slurry 25 is poured into funnel 23 and into the interblock spaces through the central opening 22. Funnel 23 may be provided with a hollow axial tube for the escapement of displaced air on the introduction of the slurry into the open spaces. If desired, the slurry 25 may be forced into the mold under pressure rather than flowing by gravity.

Introduction of the slurry 25 is done over an interval of from five to ten minutes for an eigtht-block panel and is continued until the material no longer flows from the funnel 23 into the mold interior. During the period of introduction of the slurry, the jig assembly 10 is vibrated in its upright position by a vibrator 26 attached to a medial region of the underside of plate 14. Vibrator 26 is driven by a compressed air line 27 connected thereto. Line 27 may have air filtering and pressure regulating apparatus 28 connected thereto to ensure uniform vibration.

When all of the slurry of bonding material 25 is injected into the mold cavities, the jig assembly 10 is rotated into a horizontal position and vibration continued for an interval of about one-half to one minute. During the vibration in both the upright and horizontal positions, pockets of occluded air are displaced exteriorly through the slurry toward outermost surfaces of the bonding material in contact with strips 19.

After the latter horizontal vibrating interval, the clamps 21 are removed and upper plate 15 lifted away from the newly-molded panel 17. The panel is allowed to remain in a horizontal position on the lower mold plate 14 for a period of about one hour, following which the panel may be lifted away from the lower mold half in completely finished form ready for use or shipment.

In the use of the molding apparatus arranged in an upright or nearly vertical position as shown in Fig. 1, the yieldable strips 19 in addition to their spacing and sealing function, also function to fully support the blocks 18 preparatorily to the introduction of the bonding material 25 between the blocks and during the time that the mortar is setting into final solidified form.

It is fully contemplated that the framing perimeter 16 of the panel 17 may have exteriorly contoured side surfaces which will facilitate its interlocking with adjacent panels for their erection as a multiplicity of units into a completely prefabricated glass block wall.

The joints between the frame 16 and adjacent blocks 18 are fully tuck-pointed into a final finish by the molding strips 19. Their resiliency permits forming a watertight seal between the blocks 18 and frame 16 to contain the mortar until it sets into final form.

In practicing the present invention, the slurry of mortar comprises a quick-setting cement such as one containing a mixture of both portland and aluminous cements. The bonding cement consists of the following preferred mixture:

| | Percent by weight |
|---|---|
| Aluminous cement | 47.5 |
| Portland cement | 51.2 |
| Lime (CaO) | 1.3 |

The cement is maintained in a completely anhydrous condition prior to its being mixed. Fine sand equal to the combined cements and lime is mixed therewith in preparing the slurry. Sufficient cold water having a temperature of about 35° F. is employed to mix the cement and sand into a fairly liquid slurry for molding. Cold water is employed to extend the setting time of the quick-setting cement and to furnish a period of about ten minutes before any setting thereof occurs. Other aggregates may be employed along with the cement other than said to constituted an inert filler.

The preferred cement is the subject of a copending patent application, title to which has been assigned to a common assignee, filed in the name of W. C. Taylor, entitled "Mortar Composition," Serial No. 638,628, filed February 6, 1957, now abandoned.

Completed panels have shown outstanding properties of both compressional and torsional strength. The panels are satisfactorily able to withstand extremely widespread deviation in temperatures, from minimum to maximum atmospheric temperatures for the northern temperate zone. Also loads of approximately 40 lbs. per square foot which are equivalent to wind velocities of 120 miles per hour have been withstood.

Panels fabricated in accordance with the foregoing method have survived such loading conditions without failure in simulated hurricane tests. Compressive edge loading tests of sample panels have shown their ability to withstand a distributed load of more than 5 tons prior to failure.

Various modifications may be resorted to within the spirit and scope of the appended claim.

We claim:

In a method of fabricating a complete glass block panel having a peripheral frame surrounding a plurality of glass blocks joined to one another and to the frame, the steps of positioning the blocks and frame in their finally assembled and spaced relation, the frame enclosing the perimeter of the assembled blocks, sealing the interstices between adjacent blocks and between the blocks and the adjacent portions of the frame while maintaining interconnecting flow passages therebetween, positioning the block and frame assembly in a substantially upwardly extending position, introducing a curable cementitious bonding material into the sealed assembly for flow through said flow passages into the sealed interstices, vibrating the block and frame assembly in its upwardly extending position, positioning said assembly in a substantially horizontal position, vibrating the assembly while in its substantially horizontal position, the combined vibrating steps eliminating essentially all voids within the bonding material, at least partially curing the essentially void-free bonding material and then removing the integrally joined frame and blocks as a complete unit.

References Cited in the file of this patent

UNITED STATES PATENTS

| | | |
|---|---|---|
| 1,953,452 | Wertz | Apr. 3, 1934 |
| 2,204,453 | Siegert | June 11, 1940 |
| 2,215,048 | McGregor et al. | Sept. 17, 1940 |
| 2,313,110 | Wertz | Mar. 9, 1943 |
| 2,572,580 | Almroth et al. | Oct. 23, 1951 |
| 2,655,710 | Roensch et al. | Oct. 20, 1953 |